United States Patent [19]

Needham

[11] Patent Number: 4,501,843
[45] Date of Patent: Feb. 26, 1985

[54] COMPOSITION OF POLYMER OF OLEFIN WITH MIXED MINERAL FILLER

[75] Inventor: Donald G. Needham, Ramona, Okla.

[73] Assignee: Phillips Petroleum Company, Bartlesville, Okla.

[21] Appl. No.: 592,495

[22] Filed: Mar. 23, 1984

[51] Int. Cl.³ .............................................. C08K 3/34
[52] U.S. Cl. .................................... 524/445; 524/447; 524/449; 524/451
[58] Field of Search ................ 524/445, 447, 449, 451

[56] References Cited

U.S. PATENT DOCUMENTS

| | | | |
|---|---|---|---|
| 3,243,397 | 3/1966 | Herkimer et al. | 524/447 |
| 3,655,565 | 4/1972 | McDonald | 252/632 |
| 3,775,521 | 11/1973 | Yamamoto et al. | 264/45 |
| 3,973,963 | 8/1976 | Venor et al. | 428/523 |
| 4,094,854 | 6/1978 | Harada et al. | 523/220 |
| 4,207,373 | 6/1980 | Segal | 428/251 |
| 4,345,044 | 8/1982 | Columbus et al. | 524/451 |

FOREIGN PATENT DOCUMENTS 49-111939  2/1973  Japan ................................. 524/445

Primary Examiner—Lewis T. Jacobs
Attorney, Agent, or Firm—A. W. Umphlett

[57] ABSTRACT

A method for improving the flexular modulus and/or impact strength of a polymer of olefin by admixing therewith a mica and at least one of talc or clay. A filled composition provided thereby.

16 Claims, No Drawings

COMPOSITION OF POLYMER OF OLEFIN WITH MIXED MINERAL FILLER

BACKGROUND OF THE INVENTION

This invention relates to filled compositions of polymer of olefins. In one of its aspect, this invention relates to improving physical characteristics of polymer of olefins by the addition of fillers. In another aspect of the invention, it relates to the use of mixed mineral fillers in compositions with polymer of olefin. In still another aspect of the invention, it relates to the use of mica with at least one other mineral filler in compositions with polymer of olefin.

Automotive companies have shown an increased interest in filled polymers of olefins, particularly when fillers are used that produce a higher flexural modulus or produce a higher impact strength. It has long been known that fiberglass is useful in producing higher flexural modulus so that the performance of fiberglass filled polymer of olefin has become a standard against which other fillers are measured. Apparently, mica has emerged as a filler that provides not only a better flexural modulus but also improved impact strength in a composition with polymer of olefin. There is, however, a major drawback to the use of mica in that an inherent tan or brown color is produced in the composition which requires very high pigment loadings to mask and produce colors acceptable to the automotive industry. It has now been found that the addition of mica along with talc or a combination of talc and clay produces compositions having better flexural modulus than fiberglass and that the combination of mica, talc, and clay also provides a better impact strength, taking advantage of the fact that a combination of mica and clay in combination with polymer of olefin has exceptionally good impact strength. The combination of mica with talc and/or clay also provides a lighter color which is easier to mask than when mica is used alone and provides compositions that are less abrasive and easier to mold than fiberglass.

It is therefore an object of this invention to provide filled compositions of polymer of olefins that have improved flexural modulus and/or improved impact strength as compared to unfilled polymer of olefin. It is another object of this invention to provide a method for improving the flexural modulus and/or impact strength of polymers of olefins by adding specific fillers. It is still another object of this invention to provide filled polymers having good color, good physical properties, and that are less abrasive and easier to mold than polymers of olefins filled with fiberglass.

Other aspects, objects and the various advantages of this invention will become apparent upon reading the specification and the appended claims.

STATEMENT OF THE INVENTION

In accordance with this invention, a filled composition is provided which is made up of polymer of olefin, mica, and at least one of talc or clay having improved flexural modulus and/or improved impact strength as compared to the polymer of olefin without the additives.

In another embodiment, the invention provides a method for improving the flexural modulus of polymer of olefin in which the polymer of olefin is admixed with mica and at least one of talc or clay to provide improvement of flexural modulus and/or impact strength, as compared to the polymer of olefin without filler.

The polymers of olefins suitable for use in this invention are any of the alpha-olefins, either as homopolymers or as copolymers with other alpha-olefins. Of particular interest in this invention are polymers of ethylene and propylene.

The mica, talc, and clay useful in the process of this invention are any of those materials which are commercially available and are commonly used as fillers with various kinds of polymers.

According to this invention, the flexural modulus of polymers of olefins is improved by the addition of a combination of mica and talc in which the polymer of olefin is present in an amount of about 60 to about 80 weight percent of the total composition, and each of the mica and talc are present in a range of about 10 to about 20 weight percent of the total composition, preferably about 12.5 weight percent to about 17.5 weight percent of the total composition.

Also according to the invention, a composition of good impact strength is provided by mixing a polymer of olefin in an amount of about 60 to about 80 weight percent of the total composition with both mica and clay with the mica and clay each present in an amount of about 10 to about 20 weight percent of the total composition, preferably about 12.5 to about 17.5 weight percent of the total composition.

Compositions having improved flexural modulus and impact strength as compared to polymers of olefin alone can be prepared by mixing polymers of olefin in an amount of about 60 to about 80 weight percent of the total composition with 3 fillers: mica, talc, and clay with each of the fillers present in an amount of about 7.5 to about 12.5 weight percent of the total composition.

The method for mixing the fillers with the polymer of olefin can be any of those well known in the art, such as mixing in a blender, an extruder or other suitable mixing device. The order of addition is not important.

To exemplify the present invention, various combinations of polypropylene and well known fillers, including fiberglass, mica, talc, calcium carbonate, clay, wollastonite, and fused silica were mixed in a loading of 30 percent by weight filler with 70 percent by weight polypropylene. Combinations of the individual filler materials were mixed with polypropylene so that total filler loading still remained at 30 weight percent and the polypropylene at 70 weight percent based on the final composition. Samples of the various filled polypropylene compositions were molded and tested for the physical characteristics shown below. Table I sets out the change in properties for the filled polymer compositions as compared to the unfilled polypropylene control. The actual values for the control are given. For convenience, the values for the filled compositions are shown as percentage deviations from the control. A positive deviation indicates a larger actual value. A negative deviation indicates a smaller actual value. The magnitude of each deviation is indicative of the actual value obtained.

TABLE

MINERAL FILLED POLYPROPYLENE
CHANGE IN PROPERTIES COMPARED TO UNFILLED CONTROL

| Sample | Fillers | Loading WT/% | Flex. Mod. Psi | Tensile Strength (yield) Psi | Elong. % | Notched Izod Impact Strength Ft/lbs, 23° C. | Melt Flow g/10 min |
|---|---|---|---|---|---|---|---|
|  | Control, unfilled | 0 | 160,000 | 4200 | 27 | 2.06 | 15.3 |
| A | Fiber Glass | 30% | +79% | −29% | −85% | −3% | −72% |
| B | Mica | 30% | +115 | −36 | −78 | +4 | −68 |
| C | Talc | 30% | +60 | −33 | −70 | −21 | −63 |
| D | Calcium carbonate | 30% | +18 | −50 | −70 | −18 | −27 |
| E | Clay | 30% | +30 | −33 | −63 | +8 | −70 |
| F | Wollastonite | 30% | +39 | −40 | −52 | +5 | −21 |
| G | Fused Silica | 30% | +18 | −55 | −70 | −30 | −74 |
| H | Mica/Talc | 15/15 | +137 | −29 | −74 | −21 | −66 |
| I | Mica/CaCO$_3$ | 15/15 | +61 | −45 | −81 | +6 | −47 |
| J | Mica/clay | 15/15 | +67 | −33 | −74 | +18 | −69 |
| K | Mica/talc/clay | 10/10/10 | +81 | −33 | −70 | +5 | −71 |
| L | Fused silica/talc | 15/15 | +69 | −38 | −70 | −49 | −81 |
| M | CaCO$_3$/Talc | 15/15 | +66 | −31 | −67 | −50 | −36 |
| N | Clay/Talc | 15/15 | +81 | −20 | −63 | −12 | −67 |
| O | Wallastonite/Talc | 15/15 | +70 | −26 | −67 | −39 | −40 |
| P | Fused silica/clay | 15/15 | +24 | −43 | −63 | −19 | −82 |
| Q | CaCO$_3$/Clay | 15/15 | +15 | −38 | −63 | −37 | −30 |
| R | Wollastonite/clay | 15/15 | +52 | −31 | −66 | −5 | −49 |
| S | Wollastonite/CaCO$_3$ | 15/15 | +18 | −40 | −59 | −13 | −23 |

| Tests used | |
|---|---|
| flexural modulus, psi | ASTM D790 |
| tensile strength, psi, type 1 specimen 2″ (50.8 mm) per min elongation, % | ASTM D638 |
| Izod impact strength, notched, 23° C. | ASTM D256 |
| melt flow, g/10 min | ASTM D1238 condition L |

FILLERS USED fiber glass: Owens Corning OC452 strands chopped into about ⅛ inch lengths mica, 60 mesh size (about 250 microns): Marietta Resources; grade 60-S Suzorite ® fused silica: Harbison-Walker Refractories, grade GP11I, average diameter of about 10–60 microns talc: Whittaker, Clark & Daniels, Inc., grade 2620, 100 weight percent through 325 mesh screen (less than about 44 microns).

clay: J. M. Huber Corp., grad Polyfil ®WC, calcined kaolin clay, 99.5 weight percent through 325 mesh screen.

calcium carbonate: Georgia Marble, grade CS-11, 99.5 weight percent through 325 mesh screen.

wollastonite F1: Nyco Inc., naturally occurring calcium silicate having a 50 percent median particle size of about 22 microns.

POLYPROPYLENE USED

Marlex CHM-040-01, Phillips Petroleum Company; ASTM D2146 classification, type II (46550), nominal density of 0.908 g/ec (ASTM D15005), nominal melt flow of 4, nominal flexural modulus of 160,000 psi (impact grade polypropylene).

INTERPRETATION OF THE RESULTS IN THE TABLE

It can be seen from the results presented in the Table that the flexural moduli of all the filled compositions are greater than that of the unfilled polypropylene control. Conversely, the tensile strength, elongation and melt flow of unfilled polypropylene are all higher than those of the filled compositions. Such behavior in physical properties is generally expected.

Samples A–G in the Table all represent comparison compositions, each one containing 30 weight percent of the indicated filler. The results show that the fiber glass and the mica filled polypropylene, especially that containing mica, have substantially higher flexural modulus than that of the unfilled control. The impact results show that glass addition slightly reduces impact strength, the addition of one of talc, calcium carbonate, and fused silica moderately reduces impact strength and the addition of one of mica, clay, and wollastonite slightly improves impact strength, all relative to the unfilled control.

Of the binary filler systems employed in sample compositions H–J and L–S, sample H containing 30 weight percent of a 50/50 weight ratio of mica and talc exhibits an outstanding increase in flexural modulus relative to the unfilled control. The increase would not be expected based on the lower values obtained for mica and talc as shown in examples B and C. Also, the tensile strength of sample H is slightly higher than that of samples B and C. However, the large increase in the flexural modulus is offset to some extent by a moderate decrease in imparct strength. The composition has adequate impact strength for many applications such as toys, housings, automotive parts and the like.

Relative to the unfilled control and to sample A containing fiber glass, the results for sample J show that a 50/50 weight percent mica/clay filler combination gives a composition having substantially improved flexural modulus and impact strength. The improvement is impact strength would not be expected based on the compositions using either mica (sample B) or clay (sample E) alone as filler.

Sample K, containing the mica/talc/clay combination exhibits a substantial increase in flexural modulus coupled with a slight increase in impact strength relative to the unfilled control with the overall results being somewhat superior to those of sample A containing a fiber glass filler.

The remaining compositions are considered to be deficient in one or more of flexural modulus, tensile strength and impact strength for the applications contemplated and as indicated above.

I claim:

1. A composition comprising polymer of olefin, mica, and talc having improved flexural modulus as compared to said polymer of olefin alone, said polymer of olefin present in an amount of about 60 to about 80 weight percent of the total composition, said mica present in an amount of about 10 to about 20 weight percent of the total composition and said talc present in an amount of about 10 to about 20 weight percent of the total composition.

2. A composition of claim 1 wherein said mica is present in an amount of about 12.5 weight percent to about 7.5 weight percent of the total composition and said talc is present in an amount of about 12.5 to about 17.5 weight percent of the total composition.

3. A composition of claim 2 wherein said polymer of olefin is present in an amount of about 70 weight percent, said mica is present in an amount of about 15 weight percent of the total composition and said talc is present in an amount of about 15 weight percent of the total composition.

4. A composition of claim 3 wherein the polymer of olefin is polypropylene.

5. A method for improving the flexular modulus of polymer of olefin comprising admixing said polymer of olefin in an amount of about 60 to about 80 weight percent of the total composition with (1) mica in an amount of about 10 to about 20 weight percent of the total composition and (2) talc in an amount of about 10 to about 20 weight percent of the total composition.

6. A method of claim 5 wherein said mica is admixed in an amount of about 12.5 to about 17.5 weight percent of the total composition and said talc is admixed in an amount of about 12.5 to about 17.5 weight percent of the total composition.

7. A method of claim 2 wherein said polymer of olefin is admixed in an amount of about 70 weight percent of the total composition, said mica is admixed in an amount of about 15 weight percent of the total composition and said talc is admixed in an amount of about 15 weight percent of the total composition.

8. A method of claim 7 wherein said polymer of olefin is polypropylene.

9. A composition comprising polymer of olefin, mica, and clay having improved impact strength as compared to said said polymer of olefin alone said polymer of olefin present in an amount of about 60 to about 80 weight percent of the total composition, said mica present in an amount of about 10 to about 20 weight percent of the total composition and said clay present in an amount of about 10 to about 20 weight percent of the total composition.

10. A composition of claim 9 wherein said mica is present in an amount of about 12.5 to about 17.5 weight percent of the total composition and said clay is present in an amount of about 12.5 to about 17.5 weight percent of the total composition.

11. A composition of claim 10 wherein said polymer of olefin is present in an amount of about 70 weight percent of the total composition, said mica is present in an amount of about 15 weight percent of the total composition and said clay is present in an amount of about 15 weight percent of the total composition.

12. A composition of claim 11 in which said polymer of olefin is polypropylene.

13. A method for improving the impact strength of polymer of olefin comprising admixing said polymer of olefin in an amount of about 60 to about 80 weight percent of the total composition with (1) mica in an amount of about 10 to about 20 weight percent of the total composition and (2) clay in an amount of about 10 to about 20 weight percent of the total composition.

14. A method of claim 13 wherein said mica is admixed in an amount of about 12.5 to about 17.5 weight percent of the total composition and said clay is admixed in an amount of about 12.5 to about 17.5 weight percent of the total composition.

15. A method of claim 14 wherein said polymer of olefin is admixed in an amount of about 70 weight percent of the total composition, said mica is admixed in an amount of about 15 weight percent of the total composition and said clay is admixed in an amount of about 15 weight percent of the total composition.

16. A method of claim 15 wherein said polymer of olefin is polypropylene.

* * * * *